Dec. 18, 1956  S. HOLM  2,774,573
REGENERATIVE HEAT EXCHANGER WITH RECIPROCABLE RODS
Filed July 16, 1952
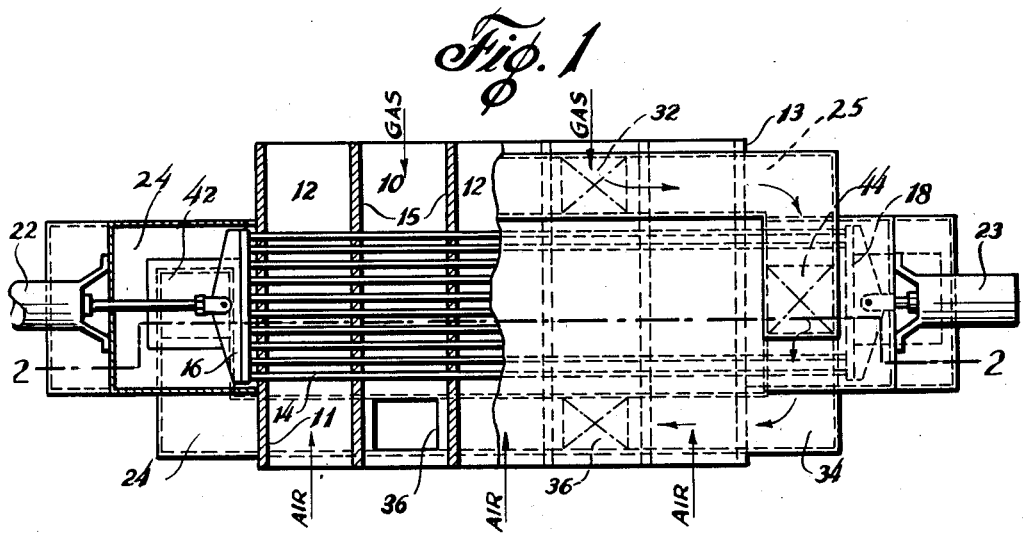
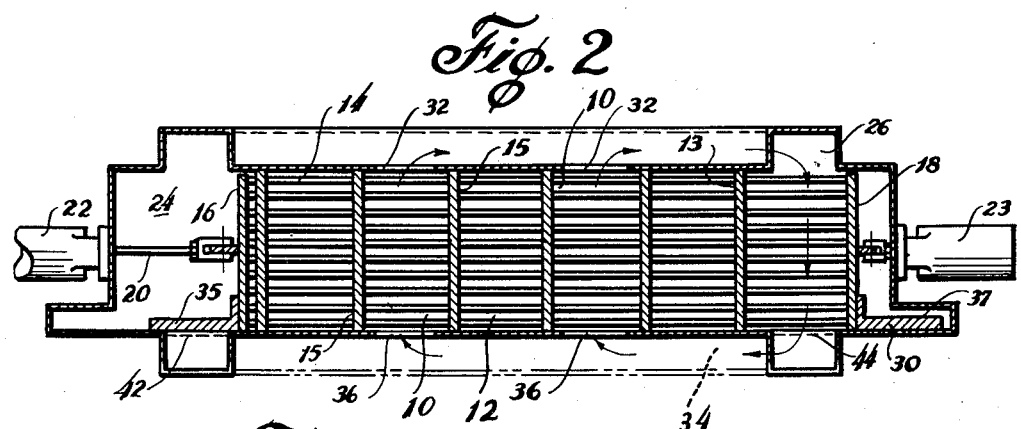
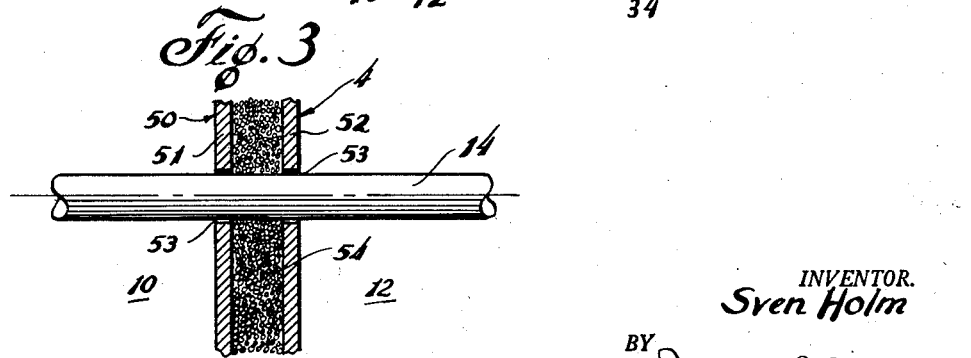
INVENTOR.
Sven Holm
BY
ATTORNEY

2,774,573
REGENERATIVE HEAT EXCHANGER WITH RECIPROCABLE RODS

Sven Holm, Wellsville, N. Y., assignor to The Air Preheater Corporation, New York, N. Y.

Application July 16, 1952, Serial No. 299,105

6 Claims. (Cl. 257—6)

The present invention relates to heat exchangers and particularly to improvements in a regenerative type of heat exchanger in which a mass of heat absorbing material is positioned first in the path of hot gases to absorb heat and then in an air stream, for example, to impart the heat to the air.

The invention specifically contemplates improvements in the type of regenerative heat exchanger in which a mass of rods are mounted for reciprocation so that parts thereof may be positioned first in a gas conduit so as to be heated by gas flowing therein and later in an adjacent air conduit to give up the heat to the air. A heat exchanger of this general type is shown in the U. S. patent to T. E. Murray 1,548,158 of August 4, 1925. The present invention is directed to improvements in this type of heat exchanger designed to increase its efficiency and overcome certain disadvantages.

The invention will be best understood upon consideration of the following detailed descriptions of an illustrative embodiment thereof when read in conjunction with the accompanying drawings in which:

Figure 1 is a diagrammatic elevational view of a regenerative heat exchanger embodying the present invention, some parts being broken away and others shown in section to illustrate details of construction.

Figure 2 is a sectional view along the line 2—2 in Figure 1.

Figure 3 is a fragmentary view of a preferred construction for the passage defining partitions.

Referring to the drawings, the heat exchanger comprises a series of gas passages 10 arranged in alternation with air passages 12, the gas and air passages being juxtaposed and extending in parallel relation and bounded by the side wall members 11 and 13, and intermediate partitions 15 that separate the gas from the air passages. A bundle of relatively thin rods 14 of a material of good heat absorbing capacity are secured at their opposite ends to the cross pieces or yokes 16, 18 and extend through appropriate openings in the wall members 11, 13 and partitions 15. The yokes 16, 18 are connected by clevises to reciprocating engines designated generally at 22 and 23 so that when the engine 22 is in operation the rods 14 may be drawn (not pushed) to the left and when the engine 23 is in operation the rods may be drawn to the right; reciprocation of the rods thus effected disposes portions thereof first in gas passages 10 to absorb heat and subsequently locate these same portions in adjacent air passages 12 to impart heat to the stream of air. The rods 14 are of sufficient length that in any stage of operation they project beyond the extreme wall member 11, 13 bounding the gas and air passages by an amount somewhat greater than the stroke of reciprocation to which a rod is subjected. To receive the rods projected from the extreme wall member 11, 13 when in this position chambers 24, 26 are formed at either end of the row of gas and air passages in which the projecting portions of the rods are disposed when not located in one of the main air and gas passages. Some of the heating gas may be circulated through the chamber 26, for example, by way of the conduit 25 which is shown receiving gas through the opening 32 in the roof of a gas passage 10 and while other conduits 34 connected to openings 42, 44 in the floor of chambers 10 return the gas to the gas passage 10, in a location beyond the rod bundle 16 where an opening 36 is formed. With this arrangement the portions of the rods 14 not occupying one of the main air and gas passages 10, 12 are nevertheless full operative, being heating by circulation of a part of the gas through the chamber 24, 26 occupied by the projecting parts of the rods. Valve members 30 and 35 are provided to control the flow of gas through the chambers 24, 26, these being normally closed and adapted to be opened when the related chamber is occupied by rod portions. Various mechanisms may be employed to open or close the valve member 30 in relation to the movement of the rods 16; as shown herein, the valve members comprise slides movable with respect to the ports leading to or from the chambers 24, 26 and the slide members are connected to the yokes 16, 18 to move in unison with the reciprocating rods.

An advantage of the construction described above is that because the rods are drawn rather than pushed through the partitions in their reciprocation the size of the rods may be considerably reduced and with a gain of the heat transfer advantages possessed by comparatively thin rods. A further advantage of this construction is that the regenerative heat transfer elements are self-cleaning because the rods in being drawn through the partition apertures in which they closely fit cause deposits to be scraped therefrom and carried off in the fluid stream. The partitions and walls that separate the gas and air passages may also be made of Carborundum or other suitble refractory with a resultant further gain in heat transfer effectiveness. By utilizing rods which are somewhat greater in length than the widths of the contiguous gas and air passages by an amount slightly greater than the stroke of reciprocation, the gas and air passages are all occupied by heating surface at all times so that there is no by-passing of the air or heating fluid around the heating surfaces. The elimination of fluctuations and shocks in the pressure in the stream of gas or air will also result in increased heat transfer.

In Figure 3 the partition 50 that separates two adjacent air and gas passages, 10, 12 respectively consists of a pair of planar wall members 51, 52 formed with alined apertures 53 through which the rods 14 extend. The space between the wall members 51, 52 is filled with a packing of granular material of a nature capable of cleaning ash particles, dust or chemical deposits from the rods as they are reciprocated; this may be a refractory material or an abrasive.

What I claim is:

1. A heat exchanger having a casing providing a series of passages for hot gases arranged in alternation with passages for relatively cool air all bounded by parallel wall members; a bundle of reciprocable, parallel rods extending through said wall members and laterally of said passages, said rods being of a length to simultaneously extend across all of said passages and to project beyond the extreme wall at either end of said series by an amount greater than the stroke of reciprocation of said rods; cross-bar means located at either end of said bundle of rods and secured to both ends of all of said rods; means connected to each of said cross-bars and operable to apply drawing forces to opposite ends of said rods in alternation to effect their reciprocation to move portions thereof from gas passages into adjacent air passages and vice versa; means forming a pair of chambers at either end of said series of passages of a width to receive the portions of said rods that project from the end wall member on either movement of reciprocation of said rods; conduit means interconnecting said chambers with spaced hot gas passages for circulating gas through said chambers to heat the rod portions therein; valves across said conduits controlling the flow of gas through said chambers; and means responsive to the position of said rods for opening the valves controlling flow through the chamber occupied by rod portions that project into said chamber and for closing said valves on retraction of said rods.

2. A heat exchanger having a casing providing a series of juxtaposed parallel passages for hot gases and relatively cool air separated by intervening partitions; a plurality of reciprocable rods extending through said partitions and laterally of said passages; said rods being of a length to simultaneously extend across all of said passages and to project beyond the extreme partition by an amount somewhat greater than the stroke of reciprocation of said rods; yoke means located at either end of said group of rods and secured to both ends of all of said rods; means connected to each of said cross-bars and operable to exert a drawing force on said rods to move portions thereof from a gas passage into an adjacent air passage and vice versa; and means for applying a drawing force to either end of said rods in alternation to effect their reciprocation.

3. A heat exchanger having a casing providing a series of juxtaposed parallel passages for hot gases and relatively cool air separated by intervening partitions; a plurality of reciprocable rods extending through said partitions and laterally of said passages; said rods being of a length to simultaneously extend across all of said passages and to project beyond the extreme partition by an amount somewhat greater than the stroke of reciprocation of said rods; yoke means located at either end of said group of rods and secured to both ends of all of said rods; means connected to each of said cross-bars and operable to exert a drawing force on said rods to move portions thereof from a gas passage into an adjacent air passage and vice versa; and means for applying a drawing force to either end of said rods in alternation to effect their reciprocation; means forming a pair of chambers, one at either end of said series of passages, each of a width to receive the portions of said rods that project from the end partition on either stroke of reciprocation of said rods; conduit means interconnecting said chambers with spaced hot gas passages circulating gas through said chambers to heat the rod portions therein; normally closed valve means across said conduits controlling the flow of gas to said chambers; and means responsive to the movement of said rods for opening the valve members controlling flow through the chamber occupied by rod portions that porject into said chamber.

4. A heat exchanger as defined in claim 2 wherein a passage defining partition comprises a pair of spaced wall members formed with alined apertures through which said rods extend to project beyond either side of said partition; and a granular packing filling the space between said partitions and lying around said rods in contact with the latter.

5. A heat exchanger as defined in claim 4 wherein as packing is a refractory material.

6. A heat exchanger as defined in claim 4 wherein said packing is an abrasive material capable of cleaning said rods.

References Cited in the file of this patent

UNITED STATES PATENTS

| 1,183,312 | Martin | May 16, 1916 |
| 1,548,158 | Murray | Aug. 4, 1925 |
| 1,601,355 | Esbran | Sept. 28, 1926 |
| 1,845,239 | Colby | Feb. 16, 1932 |
| 2,017,676 | Von Girsewald et al. | Oct. 15, 1935 |

FOREIGN PATENTS

| 410,358 | Italy | Apr. 6, 1945 |